(12) United States Patent
Thota et al.

(10) Patent No.: US 12,267,261 B2
(45) Date of Patent: Apr. 1, 2025

(54) MULTI-USER COMMUNICATION FOR WIRELESS DEVICES

(71) Applicant: Cypress Semiconductor Corporation, San Jose, CA (US)

(72) Inventors: Sri Ramya Thota, Bangalore (IN); Prashant Kota, Karnataka (IN); Saishankar Nandagopalan, San Diego, CA (US); Amit Shaw, Bangalore (IN); Ayush Sood, Bangalore (IN); Sreenivas Karanam, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 412 days.

(21) Appl. No.: 17/656,614

(22) Filed: Mar. 25, 2022

(65) Prior Publication Data

US 2022/0416962 A1 Dec. 29, 2022

Related U.S. Application Data

(60) Provisional application No. 63/214,568, filed on Jun. 24, 2021.

(51) Int. Cl.
*H04W 4/00* (2018.01)
*H04L 5/00* (2006.01)
*H04L 69/22* (2022.01)

(52) U.S. Cl.
CPC .......... *H04L 5/0044* (2013.01); *H04L 5/0048* (2013.01); *H04L 69/22* (2013.01)

(58) Field of Classification Search
CPC ..... H04L 5/0044; H04L 5/0048; H04L 69/22; H04L 69/324; H04L 5/0055; H04L 1/16; H04W 74/06; H04W 80/02; H04W 28/06; H04W 4/80; H04W 28/04; H04W 88/08; H04B 1/0003
USPC ......................................... 370/329, 330, 328
See application file for complete search history.

(56) References Cited

U.S. PATENT DOCUMENTS

| | | | |
|---|---|---|---|
| 2018/0077723 A1* | 3/2018 | Adachi | H04L 27/2602 |
| 2019/0058511 A1* | 2/2019 | Bolotin | H04L 1/1864 |
| 2019/0068255 A1* | 2/2019 | Bolotin | H04L 1/0003 |
| 2021/0226746 A1* | 7/2021 | Sekiya | H04L 5/0007 |

* cited by examiner

*Primary Examiner* — Chuong T Ho

(57) ABSTRACT

Systems, methods, and devices provide multi-user communication between wireless devices. Methods include identifying, using processing elements of a software enabled access point, a plurality of wireless devices communicatively coupled to the software enabled access point, aggregating, using the processing elements, data associated with the plurality of wireless devices, and generating, using the processing elements, transmission instructions identifying transmission periods for the plurality of wireless devices. Methods also include generating, using the processing elements, a data frame based on the aggregated data, the data frame comprising a data payload that comprises the aggregated data and the transmission instructions.

20 Claims, 9 Drawing Sheets

MULTI-USER COMMUNICATION FOR WIRELESS DEVICES

CROSS-REFERENCE TO RELATED APPLICATIONS

This application claims the benefit under 35 U.S.C. § 119(e) of U.S. Provisional Patent Application No. 63/214,568, filed on Jun. 24, 2021, which is incorporated herein by reference in its entirety for all purposes.

TECHNICAL FIELD

This disclosure generally relates to wireless devices, and more specifically, to facilitating communication between such wireless devices in a network.

BACKGROUND

Wireless devices may communicate with each other via one or more wireless modalities, such as a Wi-Fi connection. Accordingly, such wireless communication may be implemented in a manner compliant with a wireless protocol. Moreover, such wireless devices may include various hardware components to facilitate such communication. For example, wireless devices may include transmission media that may include one or more antennas. Moreover, wireless devices may be connected in a network that includes an access point and multiple stations. Conventional techniques for managing communications between such access points and stations remain limited because they are not able to efficiently manage communications between multiple users associated with such stations.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

As will be discussed in greater detail below, wireless devices may communicate with each other via one or more communications modalities. For example, wireless devices, such as access points and stations, may transmit data to each other over a wireless network. In various embodiments, the access point is a software enabled access point (SoftAP). Accordingly, a SoftAP may be a station that has been configured, via software, to perform various access point functionalities.

Because such SoftAPs are configured via software, they do not have hardware that is used for various access point functionalities. For example, a communications protocol, such as a Wi-Fi protocol that may be an 802.11ax protocol, may use HE DL MU PPDU or HE DL MU MIMO PPDU frames for transmission and HETB PPDU frames for reception with multiple users. However, conventional SoftAPs are not able to utilize these transmission and reception frames because they do not have the hardware required to generate such frames. Accordingly, conventional SoftAPs are limited in their ability to facilitate communication amongst multiple stations and multiple users using a Wi-Fi communications protocol, such as an 802.11ax protocol.

Embodiments disclosed herein provide the ability to efficiently manage communications between multiple wireless devices associated with multiple users. As will be discussed in greater detail below, access points, which may be SoftAPs, may be configured to aggregated data associated with multiple stations and users, and include the aggregated data and timing information in a single data frame or frame. The stations may then parse the payload of the data frame to retrieve their respective data, and then generate and send an acknowledgement message or a data transmission in accordance with the timing information. In this way, all data and scheduling information may be sent by a SoftAP in a single data frame or frame, and additional transmissions and contention periods are avoided thus increasing the efficiency of such transmission.

Figure 1:
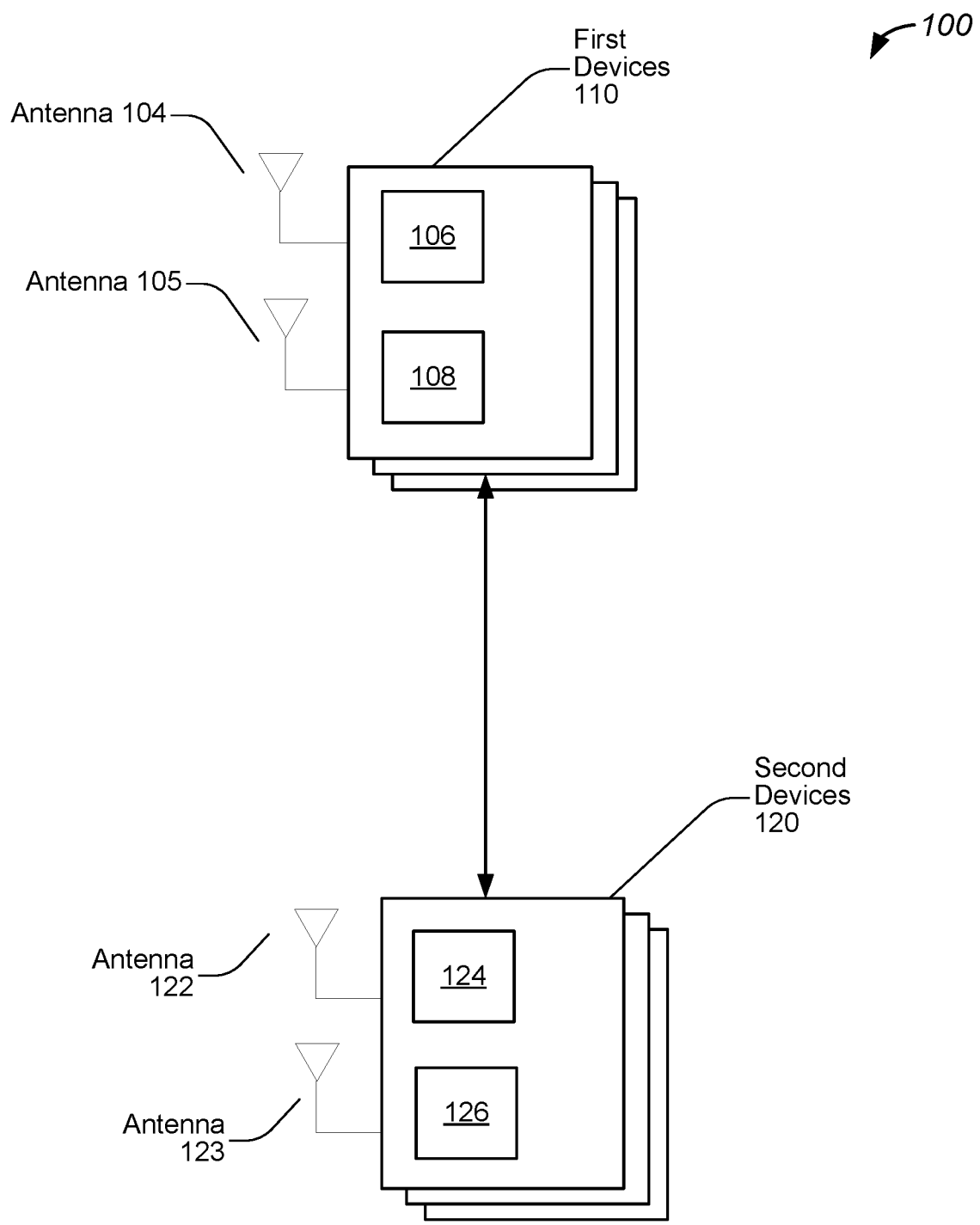
FIG. 1 illustrates an example of a system for wireless communication, configured in accordance with some embodiments.

FIG. 1 illustrates an example of a system for wireless communication, configured in accordance with some embodiments. As discussed above, various wireless devices may communicate with each other via one or more wireless communications media. For example, wireless devices may communicate with each other via a Wi-Fi connection or any other suitable wireless connection. In various embodiments, the wireless devices may include one or more radios configured in accordance with such wireless protocols. As will be discussed in greater detail below, wireless devices disclosed herein and systems, such as system 100, that implement such wireless devices are configured to transmit information for multiple users and their associated devices in a single data frame. Accordingly, embodiments disclosed herein enable improved efficiency of communication between such devices, which may be access points and stations.

In various embodiments, system 100 may include first devices 110 which may be wireless devices. As discussed above, such wireless devices may be compatible with one or more wireless transmission protocols, such as a Wi-Fi protocol. Accordingly, first devices 110 may include a Wi-Fi radio, as well as its associated processing logic. In some embodiments, radios included in first devices 110 may be compatible with an 802.11ax protocol. In various embodiments, first devices 110 may be devices found in local networks and mesh networks such as devices in a wireless gaming system or devices in an infotainment system of an automobile. It will be appreciated that such wireless devices disclosed herein may be any suitable device.

As shown in FIG. 1, various wireless devices may be in communication with each other via one or more wireless communications mediums. As shown in FIG. 1, first devices 110 may each include antennas, such as antenna 104 and antenna 105. First devices 110 may also include processing device 108 as well as radio 106. As used herein, a radio may refer to a transceiver as well as associated supporting processing hardware, as will be discussed in greater detail below with reference to FIG. 3. Moreover, such processing devices and radios may be configured to improve the efficiency of communication with other wireless devices. More specifically, components of first devices 110 may be configured to aggregate data for multiple users into a single data payload configured to be parsed and utilized by wireless devices associated with the multiple users.

In some embodiments, system 100 may further include second devices 120 which may also be wireless devices. As similarly discussed above, second devices 120 may be compatible with one or more wireless transmission protocols, such as a Wi-Fi protocol. Moreover, second devices 120 may also be devices such as those found in cars, other vehicles, or gaming systems. In various embodiments, second devices 120 may be different types of devices than first devices 110. As discussed above, each of second devices 120 may include antennas, such as antenna 122 and 123, as well as processing device 126 and radio 124. As discussed above, second devices 120 may also be configured to improve the efficiency of communication with other wireless devices. Additional details regarding such improved multi-user communication will be discussed in greater detail below.

Figure 2:
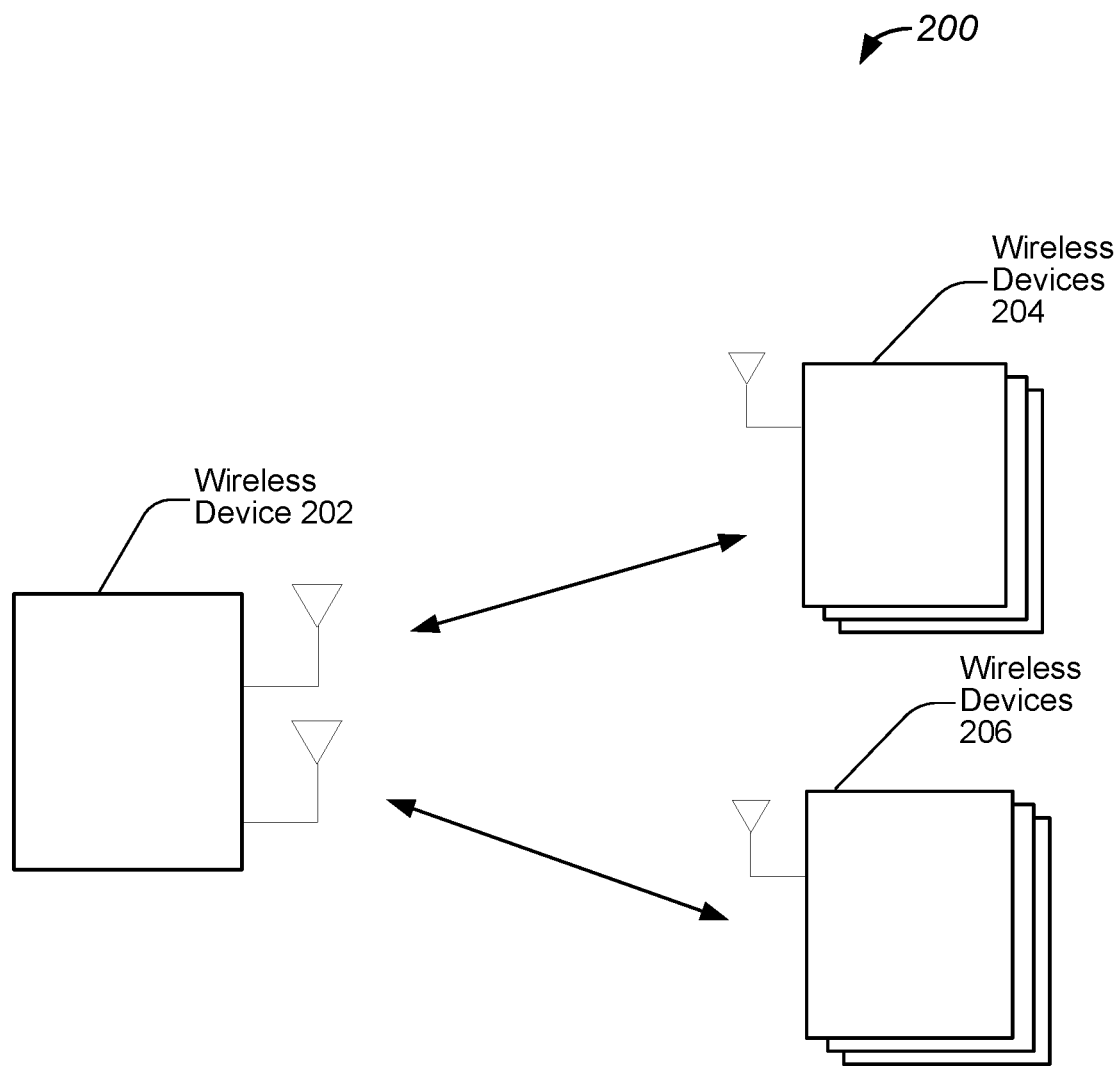
FIG. 2 illustrates an example of another system for wireless communication, configured in accordance with some embodiments.

FIG. 2 illustrates an example of another system for wireless communication, configured in accordance with some embodiments. In various embodiments, system 200 may include wireless devices 204 and wireless devices 206. Each of wireless devices 204 and wireless devices 206 may be single-radio devices specifically configured to implement a particular communications protocol. In some embodiments, system 200 further includes wireless device 202 which may be configured to communicate with wireless devices 204 and wireless devices 206.

As similarly discussed above, wireless device 202 is configured to aggregate data for multiple users into a single data payload configured to be parsed and utilized by wireless devices associated with the multiple users. More specifically, wireless device 202 may include a Wi-Fi radio to communicate with wireless devices 204 and wireless devices 206. Furthermore, wireless device 202 may be configured as a software enabled access point (SoftAP). Accordingly, wireless device 202 may be a station that has been configured to implement access point functionalities via a software configuration. Moreover, wireless devices 204 and wireless devices 206 may be stations that are communicatively coupled to wireless device 202 via a communications network. Accordingly, as will be discussed in greater detail below, wireless device 202 may aggregate data for multiple stations into a single data payload, thus reducing additional contention periods and frame transmissions, and improving the efficiency of multi-user communication with a SoftAP.

Figure 3:
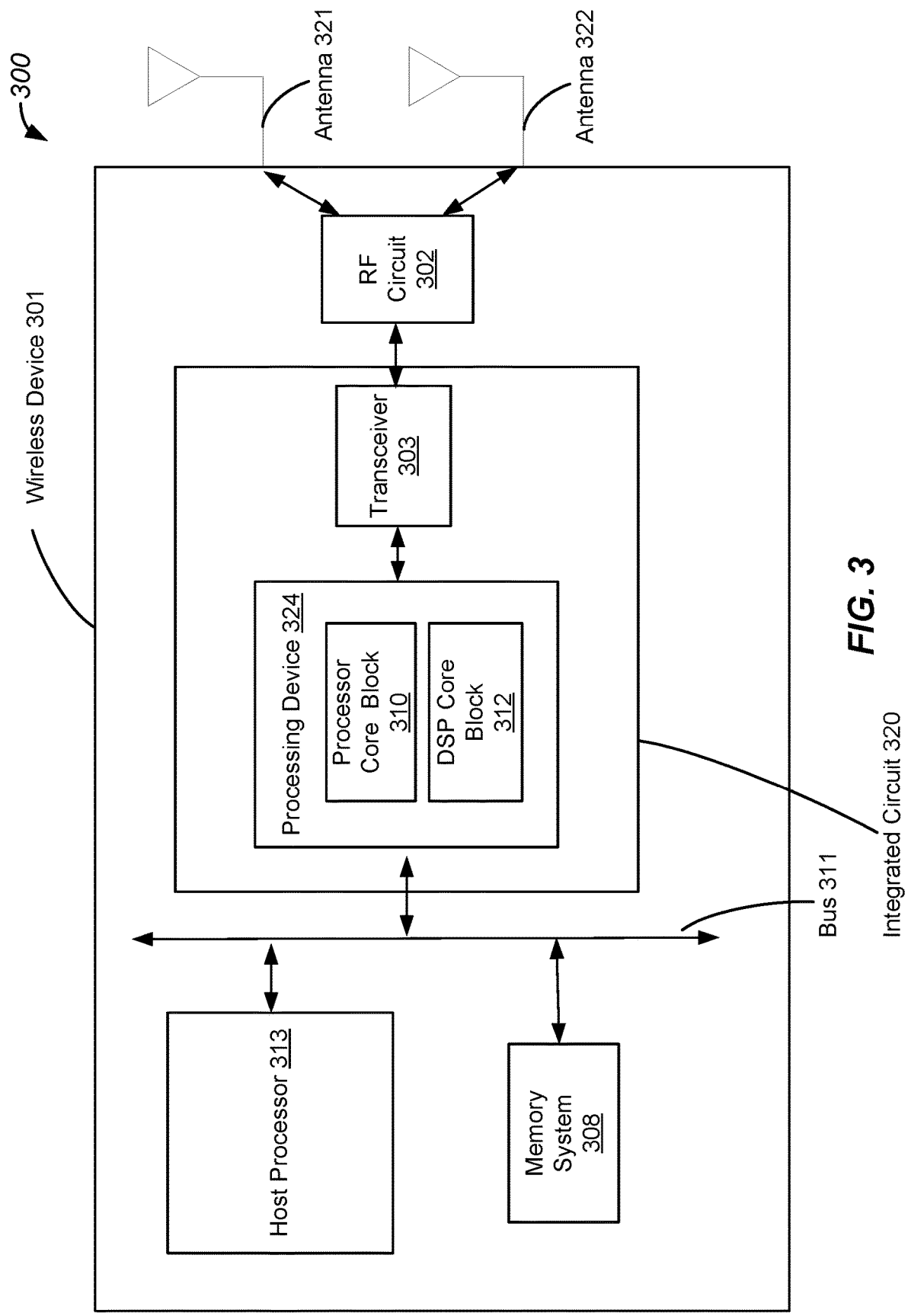
FIG. 3 illustrates an example of yet another system for wireless communication, configured in accordance with some embodiments.

FIG. 3 illustrates an example of yet another system for wireless communication, configured in accordance with some embodiments. More specifically, FIG. 3 illustrates an example of a system, such as system 300, that may include wireless device 301. It will be appreciated that wireless device 301 may be one of any of the wireless devices discussed above with reference to FIGS. 1 and 2, such as first devices 110, second devices 120, wireless device 202, wireless devices 204, or wireless devices 206.

In various embodiments, wireless device 301 includes one or more transceivers, such as transceiver 303, which may be included in a radio such as radios 106 and 124 discussed above. In one example, system 300 includes transceiver 303 which is configured to transmit and receive signals using a communications medium that may include antenna 321 or antenna 322. As noted above, transceiver 303 may be a Wi-Fi transceiver. Accordingly, transceiver 303 may be compatible with a Wi-Fi communications protocol, such as an 802.11ax protocol. In various embodiments, transceiver 303 includes a modulator and demodulator as well as one or more buffers and filters, that are configured to generate and receive signals via antenna 321 and/or antenna 322.

In various embodiments, system 300 further includes one or more processing devices, such as processing device 324 which may include logic implemented using one or more processor cores. Accordingly, processing device 324 is configured to implement logic for data aggregation operations and/or parsing operations, as will be discussed in greater detail below. For example, when wireless device 301 is configured as a SoftAP, processing device 324 may be configured to perform data aggregation and data frame and data frame operations, as discussed in greater detail below. Processing device 324 may also be configured to perform parsing operations, as may be the case when wireless device 301 is a station.

Accordingly, processing device 324 includes processing elements configured to perform the data aggregation operations and/or parsing operations that will be described in greater detail below. Processing device 324 includes one or more components configured to implement a media access control (MAC) layer that is configured to control hardware associated with a wireless transmission medium, such as that associated with a Wi-Fi transmission medium. In one example, processing device 324 may include processor core block 310 that may be configured to implement a driver, such as a Wi-Fi driver. Accordingly, processing device 324 may include components associated with transceiver 303, such as MAC layers, packet traffic arbiters, and a scheduler. In various embodiments, processing device 324 may further include digital signal processor (DSP) core block 312 which may be configured to include microcode.

System 300 further includes radio frequency (RF) circuit 302 which is coupled to antenna 321 and antenna 322. In various embodiments, RF circuit 302 may include various components such as an RF switch, a diplexer, and a filter. Accordingly, RF circuit 302 may be configured to select an antenna for transmission/reception, and may be configured to provide coupling between the selected antenna, such as antenna 321 or antenna 322, and other components of system 300 via a bus, such as bus 311. While one RF circuit is shown, it will be appreciated that wireless device 301 may include multiple RF circuits. Accordingly, each of multiple antennas may have its own RF circuit. Moreover, each one may be associated with a particular wireless communications protocol, such as a first antenna and RF circuit for Wi-Fi and a second antenna and RF circuit for Bluetooth. Moreover, while FIG. 3 illustrates system 300 as having a multiple antennas, it will be appreciated that system 300 may be implemented with a single antenna.

System 300 includes memory system 308 which is configured to store one or more data values associated with data aggregation operations and/or parsing operations discussed in greater detail below. Accordingly, memory system 308 includes storage device, which may be a non-volatile random-access memory (NVRAM) configured to store such data values, and may also include a cache that is configured to provide a local cache. In various embodiments, system 300 further includes host processor 313 which is configured to implement processing operations implemented by system 300.

It will be appreciated that one or more of the above-described components may be implemented on a single chip, or on different chips. For example, transceiver 303 and processing device 324 may be implemented on the same integrated circuit chip, such as integrated circuit chip 320. In another example transceiver 303 and processing device 324 may each be implemented on their own chip, and thus may be disposed separately as a multi-chip module or on a common substrate such as a printed circuit board (PCB). It will also be appreciated that components of system 300 may be implemented in the context of a vehicle such as an automobile. Accordingly, some components, such as integrated chip 320, may be implemented in a first location, while other components, such as antenna 321 and/or antenna 322, may be implemented in second location, and coupling between the two may be implemented via a coupler.

Figure 4:
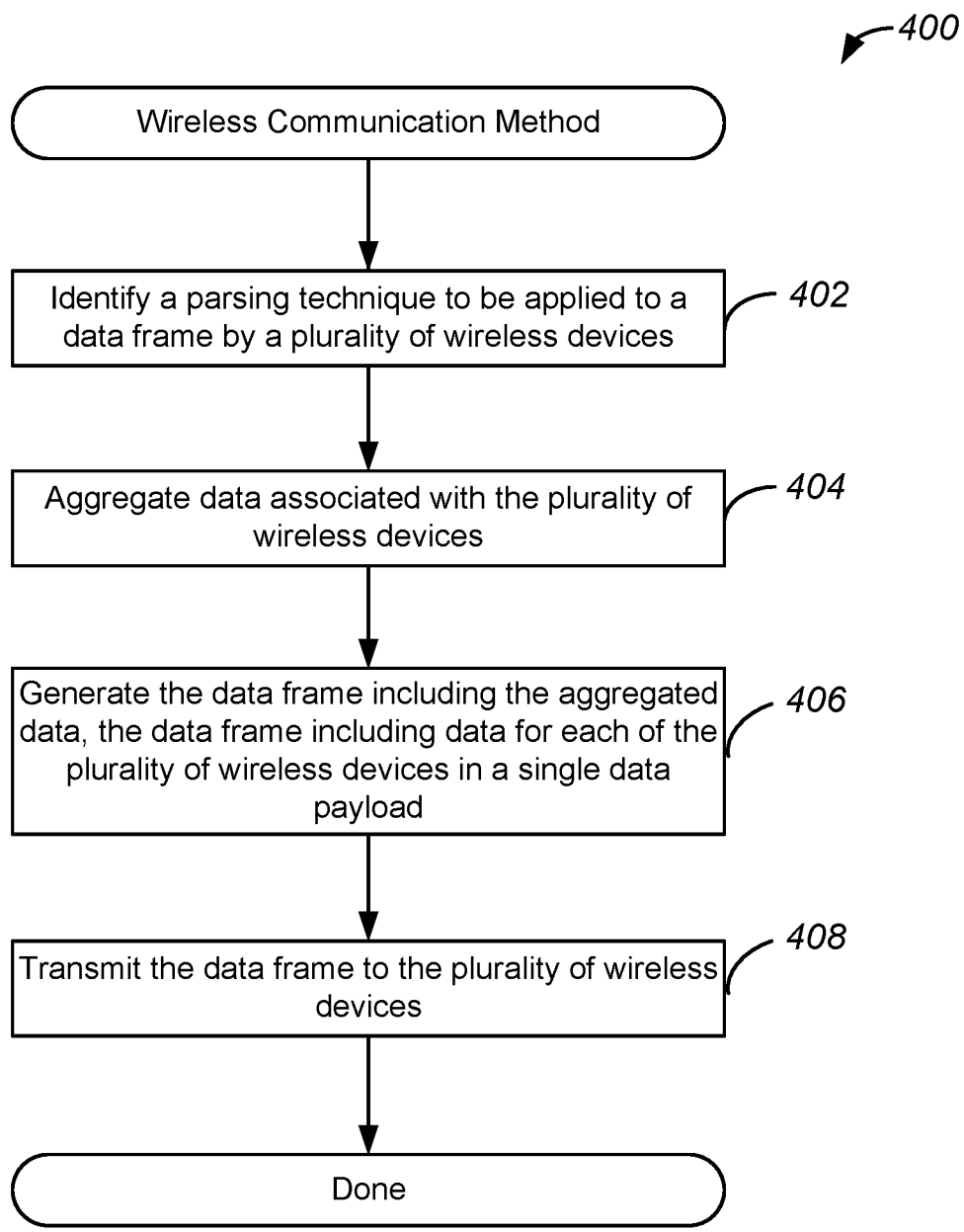
FIG. 4 illustrates an example of a method for wireless communication, configured in accordance with some embodiments.

FIG. 4 illustrates an example of a method for wireless communication, configured in accordance with some embodiments. As discussed above, various wireless devices may communicate with each other via one or more wireless communications media. As will be discussed in greater detail below, a method, such as method 400, may be performed to improve the efficiency of communication between such devices, which may be access points and stations.

Method 400 may perform operation 402 during which a parsing technique may be identified to be applied to a data frame by a plurality of wireless devices. As will be discussed in greater detail below, the parsing technique may be identified based on capabilities of the wireless devices. For example, if the wireless devices are all manufactured by a same manufacturer, and/or are all pre-configured to implement a same parsing technique, then the data aggregation operations discussed below may be performed. For example, all stations included in the plurality of wireless devices may be configured to perform full parsing of data frames, and thus may support parsing operations corresponding to the aggregated data discussed in greater detail below.

Method 400 may perform operation 404 during which data associated with the plurality of wireless devices may be aggregated. In various embodiments, the aggregated data may include data for multiple wireless devices. Accordingly, the aggregated data may include a MAC header and MAC data for a plurality of wireless devices. As will be discussed in greater detail below, the data may be aggregated by a wireless device configured as a SoftAP, and the data may be aggregated for a plurality of stations in communication with the SoftAP.

Method 400 may perform operation 406 during which a data frame may be generated. Accordingly, a data frame may be generated that includes a data payload that includes the aggregated data. As will be discussed in greater detail below, the data payload may be configured such that data for wireless devices is stored serially in the same payload. Further details of the data frame structure are also discussed in greater detail below.

Method 400 may perform operation 408 during which the data frame may be transmitted to the plurality of wireless devices. Accordingly, the data frame including the aggregated data may be sent to the wireless devices, and the wireless devices may parse the data payload to identify their corresponding data. In this way, a single data frame, which may be included in a transmission frame, may be used to transmit information for multiple wireless devices and their associated multiple users, and additional transmissions and contention periods are avoided.

Figure 5:
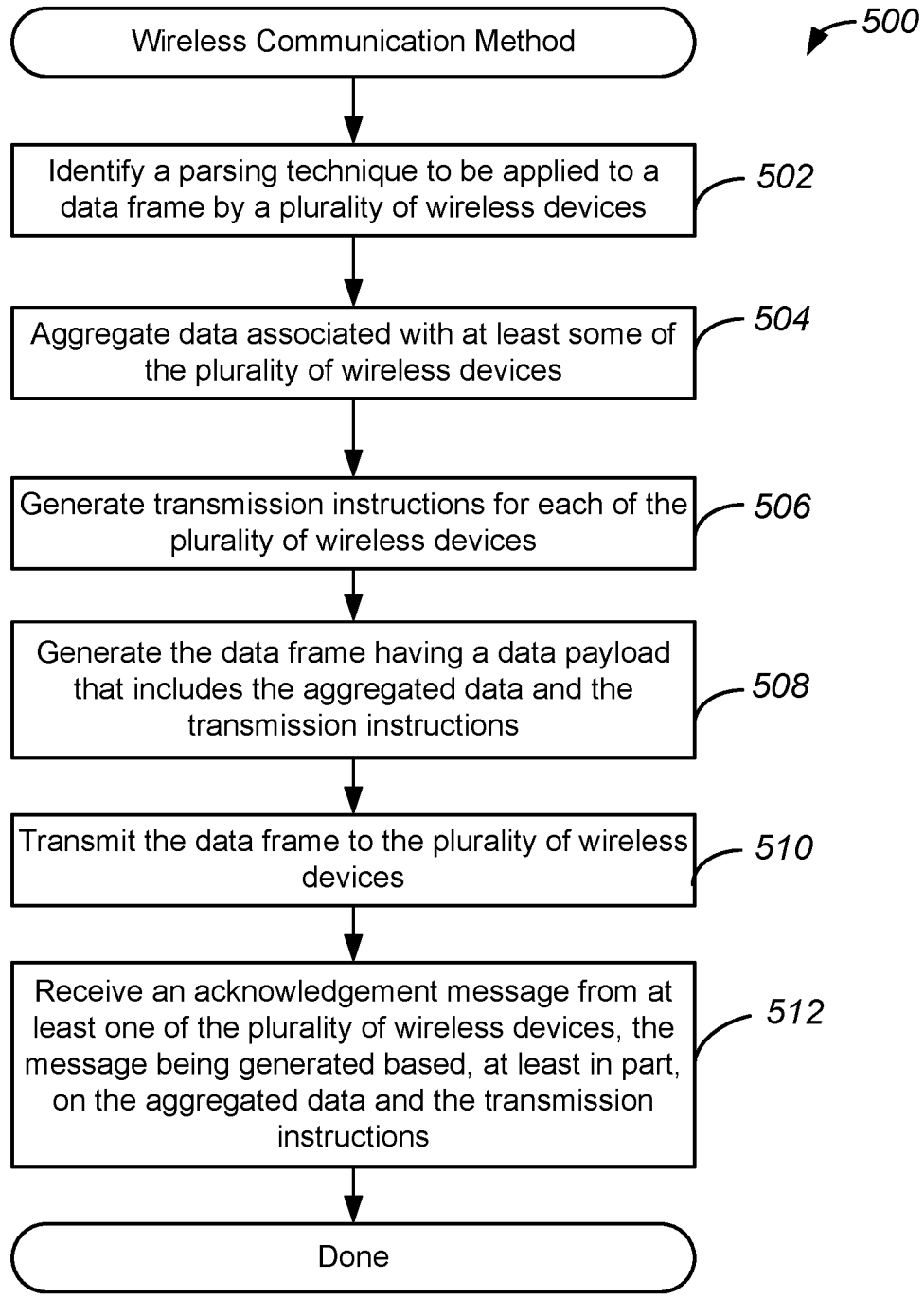
FIG. 5 illustrates an example of another method for wireless communication, configured in accordance with some embodiments.

FIG. 5 illustrates an example of another method for wireless communication, configured in accordance with some embodiments. As discussed above, various wireless devices may communicate with each other via one or more wireless communications media. As will be discussed in greater detail below, a method, such as method 500, may be performed to improve the efficiency of communication between such devices, which may be access points and stations.

Method 500 may perform operation 502 during which a parsing technique may be identified to be applied to a data frame by a plurality of wireless devices. As similarly discussed above, the parsing technique may be identified based on capabilities of the wireless devices. More specifically, wireless devices may be configured to perform partial parsing or full parsing of data payloads. As will be discussed in greater detail below, full parsing of payloads enables a receiving wireless device to scan an entire payload and find a specific data payload for that particular receiving wireless device. Accordingly, during operation 502, it may be confirmed that all wireless devices utilize full parsing of data payloads. In some embodiments, this may be confirmed based on specifications provided by a manufacturer. For example, if the wireless devices are all manufactured by a same manufacturer, all of the wireless devices may be pre-configured to implement a same parsing technique. In this way, all stations included in the plurality of wireless devices may be configured to perform full parsing of data frames, and thus may support parsing operations corresponding to the aggregated data discussed in greater detail below.

Method 500 may perform operation 504 during which data associated with at least some of the plurality of wireless devices may be aggregated. In various embodiments, the aggregated data may include data for multiple wireless devices. As similarly discussed above, the aggregated data may include a MAC header and MAC data for a plurality of wireless devices. In various embodiments, the data may be a service data unit or any suitable data that is to be transmitted to a station. For example, in the context of a gaming system where a data frame is to be transmitted from a first wireless device configured as a SoftAP to other wireless devices configured as stations that may be devices, such as gaming controllers, the data may be derived from an application, such as a gaming application.

Accordingly, the data may be aggregated by a wireless device configured as a SoftAP, and the data may be aggregated for a plurality of stations in communication with the SoftAP. Moreover, the aggregated data may be identified and retrieved by the SoftAP based, at least in part, on one or more device identifiers. For example, data to be broadcast to stations, or a particular station, may have been received from, for example, an application as discussed above. Device identifiers identifying stations in a current communications session with the SoftAP may be stored at the SoftAP, and may be used in combination with the application data to identify particular stations for which data is being transmitted. In this way, the aggregated data may include a device identifier, as may be included in a MAC header, as well as a data payload for multiple target stations.

Method 500 may perform operation 506 during which transmission instructions may be generated. In various embodiments, the transmission instructions may be a temporal mapping or a delay scheme in which the SoftAP assigns or allocates a transmission time to each station. Accordingly, each station may be assigned a particular transmission period, and the transmission periods may be staggered such that they don't overlap and conflict with each other. Accordingly, the SoftAP may generate a mapping that coordinates and schedules transmissions from the stations, and the mapping may be stored as transmission instructions.

Method 500 may perform operation 508 during which a data frame may be generated. As similarly discussed above, a data frame may be generated that includes a data payload that includes the aggregated data, and the data payload may be configured such that data for wireless devices is stored serially in the same payload. Moreover, the transmission instructions may also be included in the data frame.

Method 500 may perform operation 510 during which the data frame may be transmitted to the plurality of wireless devices. Accordingly, the data frame including the aggregated data and the transmission instructions may be sent to the wireless devices, and the wireless devices may parse the data payload to identify their corresponding data. In this way, a single data frame, which may be included in a transmission frame, may be used to transmit information for multiple wireless devices and their associated multiple users, and additional transmissions and contention periods are avoided.

Method 500 may perform operation 512 during which an acknowledgement message may be received from at least one of the plurality of wireless devices. In various embodiments, the message is generated based, at least in part, on the aggregated data and the transmission instructions. Accordingly, one or more of the wireless devices, which may be stations, may parse the data payload of the data frame, and may identify its corresponding data based on one or more identifiers, as may be included in a MAC header. The one or more wireless devices may also identify a designated transmission period based on the transmission instructions. Accordingly, each wireless device that received data may generate and send an acknowledgement message during the transmission period designated in the transmission instructions.

Figure 6:
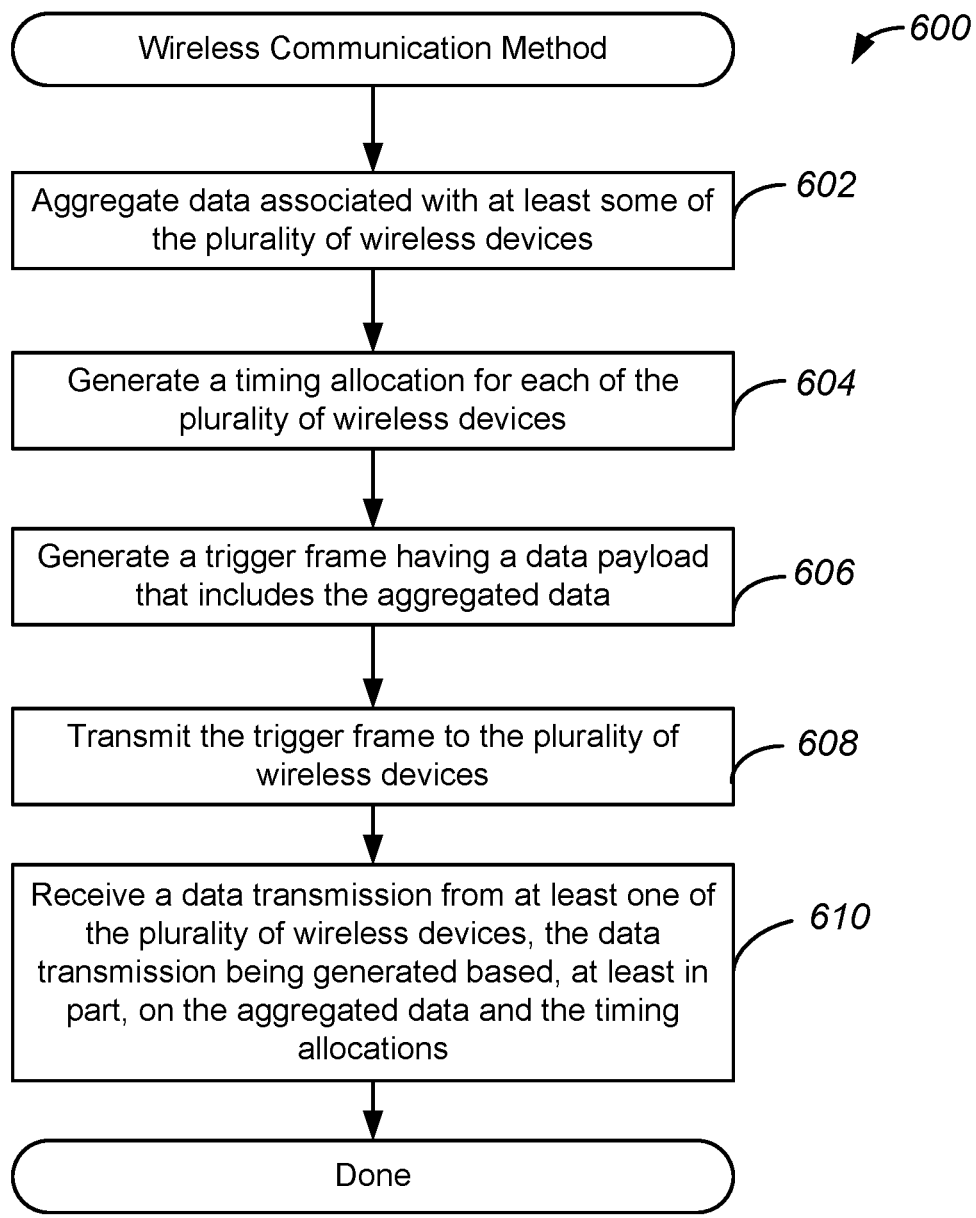
FIG. 6 illustrates an example of an additional method for wireless communication, configured in accordance with some embodiments.

FIG. 6 illustrates an example of an additional method for wireless communication, configured in accordance with some embodiments. Accordingly, a method, such as method 600, may be performed to improve the efficiency of communication between wireless devices, which may be access points and stations. As will be discussed in greater detail below method 600 may be performed to utilize a trigger frame to solicit the transmission of data from a plurality of stations.

Method 600 may perform operation 602 during which data associated with at least some of the plurality of wireless devices may be aggregated. As discussed above, the aggregated data may include data for multiple wireless devices. In various embodiments, the data may be aggregated by a wireless device configured as a SoftAP, and the data may be aggregated for a plurality of stations in communication with the SoftAP. Moreover, the aggregated data may be identified and retrieved by the SoftAP based, at least in part, on one or more device identifiers. For example, device identifiers identifying stations in a current communications session with the SoftAP may be stored at the SoftAP, and may be used to identify particular stations for which data is being transmitted. Accordingly, during operation 602 data may be aggregated that identifies a plurality of wireless devices, that are stations, for which data transmission is to be solicited.

Method 600 may perform operation 604 during which a timing allocation may be generated for each of the plurality of wireless devices. In various embodiments, the timing allocation may be a designated time period during which a station is to transmit data. Accordingly, a timing allocation may be used to identify a particular period of time during which a station should transmit data. Accordingly, the SoftAP may assign each station a timing allocation, and the timing allocations may be different such that they don't overlap and conflict with each other. Accordingly, the SoftAP may generate a schedule of timing allocations that coordinates and schedules transmissions from the stations.

Method 600 may perform operation 606 during which a trigger frame may be generated. In various embodiments, a trigger frame is configured to solicit transmission of data from a station. Accordingly, the trigger frame may identify a station that is to transmit data, and a timing of such a transmission. In various embodiments, the trigger frame may be generated to include metadata for each of a plurality of wireless devices that, as discussed above, are stations. In various embodiments, timing allocation information may be derived or inferred by a station from contents of the trigger frame as well as information previously received by the station. More specifically, timing allocation information may be derived based on the contents of the trigger frame as well as a special number (order number) and an acknowledge time allocated during an association process for each station.

Method 600 may perform operation 608 during which the trigger frame may be transmitted to the plurality of wireless devices. Accordingly, the trigger frame including the metadata may be sent to the wireless devices, and the wireless devices may parse the contents of the trigger frame to identify their corresponding metadata as well as derive a timing allocation. In this way, a single trigger frame may be used to transmit information for multiple wireless devices and their associated multiple users, and additional transmissions and contention periods are avoided.

Method 600 may perform operation 610 during which a data transmission may be received from at least one of the plurality of wireless devices. In various embodiments, the data transmission is generated based, at least in part, on the metadata and timing allocation information. The data transmission may include data that a wireless device, that may be a station, intends to transmit to other wireless devices, such as the SoftAP and other stations. Accordingly, one or more of the wireless devices may parse the contents of the trigger frame, and may identify its corresponding data based on one or more identifiers. As discussed above, the wireless device may derive timing allocation information. Accordingly, each wireless device that intends to transmit data may generate and send a data transmission during its designated timing allocation.

Figure 7:
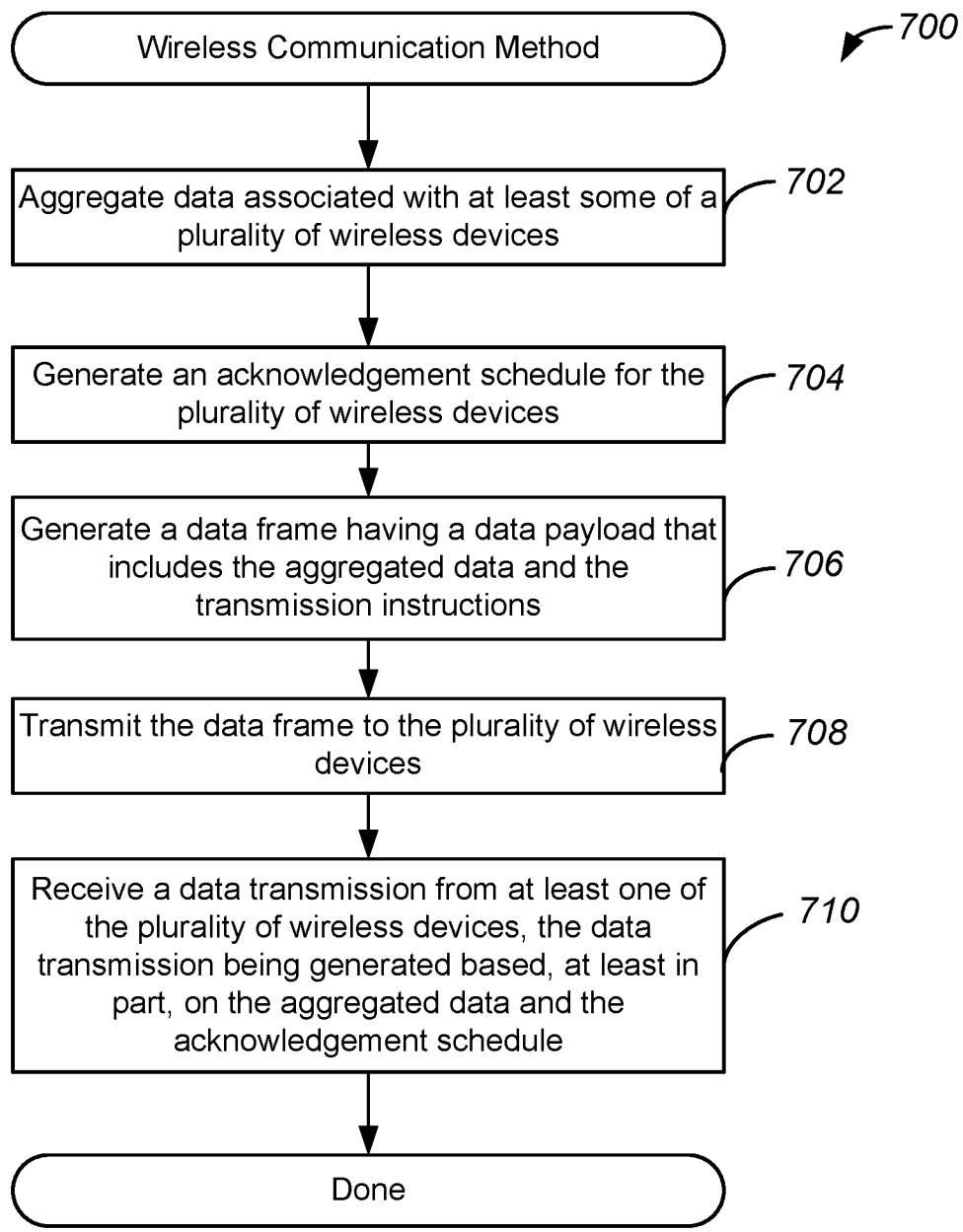
FIG. 7 illustrates an example of another method for wireless communication, configured in accordance with some embodiments.

FIG. 7 illustrates an example of another method for wireless communication, configured in accordance with some embodiments. Accordingly, a method, such as method 700, may be performed to improve the efficiency of communication between wireless devices, which may be access points and stations. As will be discussed in greater detail below method 700 may be performed to utilize an acknowledgement schedule to schedule the transmission of data from a plurality of stations.

Method 700 may perform operation 702 during which data associated with at least some of the plurality of wireless devices may be aggregated. In various embodiments, the aggregated data may include data for multiple wireless devices. As similarly discussed above, the aggregated data may include a MAC header and MAC data for a plurality of wireless devices. In various embodiments, the data may be a service data unit or any suitable data that is to be transmitted to a station. Accordingly, the data may be aggregated by a wireless device configured as a SoftAP, and the data may be aggregated for a plurality of stations in communication with the SoftAP. Moreover, the aggregated data may be identified and retrieved by the SoftAP based, at least in part, on one or more device identifiers. For example, device identifiers identifying stations in a current communications session with the SoftAP may be stored at the SoftAP, and may be used in combination with the application data to identify particular stations for which data is being transmitted. In this way, the aggregated data may include a device identifier, as may be included in a MAC header, as well as a data payload for multiple target stations.

Method 700 may perform operation 704 during which an acknowledgement schedule may be generated for the plurality of wireless devices. In various embodiments, the acknowledgement schedule may be a temporal mapping in which the SoftAP assigns or allocates a transmission time to each station. Accordingly, each station may be assigned a particular transmission period, and the transmission periods may be staggered such that they don't overlap and conflict with each other. Accordingly, the SoftAP may generate a mapping that coordinates and schedules transmissions of acknowledgment messages from the stations, and the mapping may be stored as an acknowledgement schedule.

Method 700 may perform operation 706 during which a data frame may be generated. As similarly discussed above, a data frame may be generated that includes a data payload that includes the aggregated data, and the data payload may be configured such that data for wireless devices is stored serially in the same payload. Moreover, the acknowledgement schedule may also be included in the data frame.

Method 700 may perform operation 708 during which the data frame may be transmitted to the plurality of wireless devices. Accordingly, the data frame including the aggregated data and the acknowledgement schedule may be sent to the wireless devices, and the wireless devices may parse the data payload to identify their corresponding data. In this way, a single frame containing data and a trigger may be used to transmit information for multiple wireless devices and their associated multiple users, and additional transmissions and contention periods are avoided.

Method 700 may perform operation 710 during which a data transmission may be received from at least one of the plurality of wireless devices. In various embodiments, the data transmission is generated based, at least in part, on the aggregated data and the acknowledgement schedule. Accordingly, one or more of the wireless devices, which may be stations, may parse the data payload of the data frame, and may identify its corresponding data based on one or more identifiers, as may be included in a MAC header. The one or more wireless devices may also identify a designated transmission period based on the acknowledgement schedule. Accordingly, each wireless device that received data may generate and send a data transmission during the transmission period designated in the acknowledgement schedule.

Figure 8:
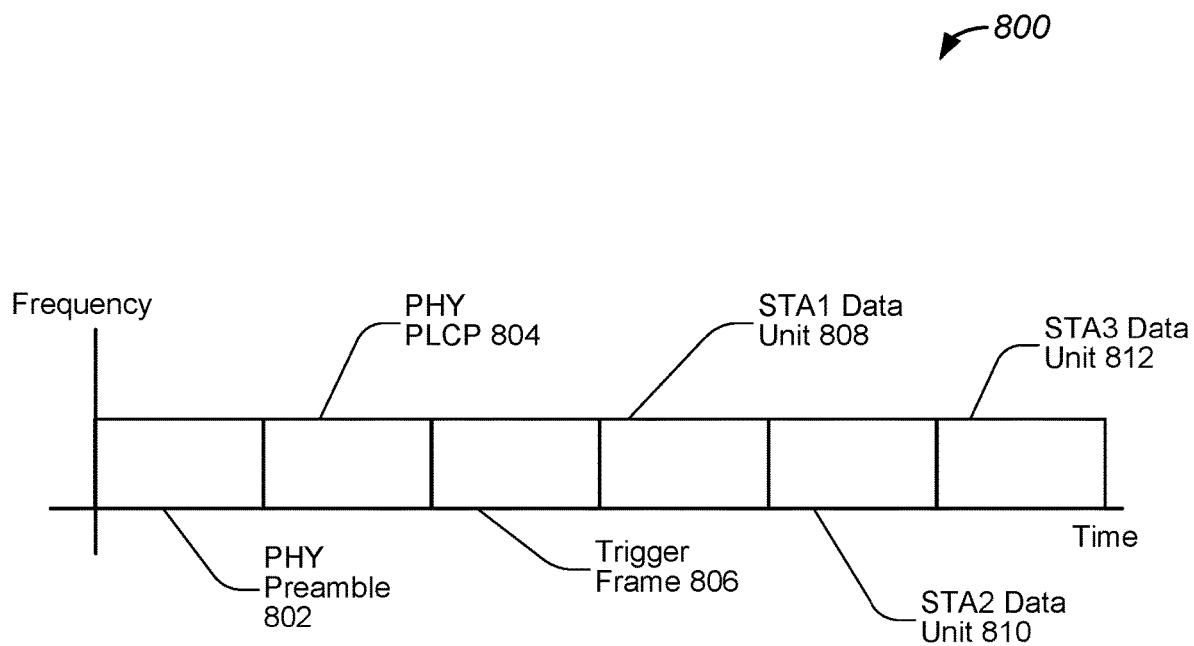
FIG. 8 illustrates an example of a transmission packet, configured in accordance with some embodiments.

FIG. 8 illustrates an example of a transmission packet, configured in accordance with some embodiments. As shown in FIG. 8, a transmission packet, such as packet 800, may be transmitted from a wireless device configured as a SoftAP. As also shown in FIG. 8 and as similarly discussed above, packet 802 is configured to include a trigger frame including trigger information for all stations associated with the SoftAP, and also includes a data unit for one or more of the stations. More specifically, packet 802 includes PHY information that may be common amongst the associated stations, as similarly discussed above. Thus, packet 802 may include PHY preamble 802 and PHY physical layer convergence procedure (PLCP) 804 which may be common amongst the associated stations. Packet 802 may also include trigger frame 806 which may include trigger information for all associated stations, as described above.

Moreover, packet 802 may also include a data unit for one or more of the associated stations. For example, packet 802 may include STA1 data unit 808 for a first station, STA2 data unit 810 for a second station, and STA3 data unit 812 for a third station. Accordingly, packet 802 may include data units for multiple associated stations, and the stations may parse the contents of packet 802 for their respective data unit which may be an aggregated MAC protocol data unit (AMPDU). As similarly discussed above, each station may check the MAC header for each data unit, and may check for a MAC address that matches its own MAC address. If an address matches its own address, the station may process that data unit, and prepare a BlockACK transmission configured in accordance with parameters included in the trigger frame. If the address does not match, the station continues to wait for the next data unit in the packet, and continues to check addresses until the last MPDU in that AMPDU.

Figure 9:
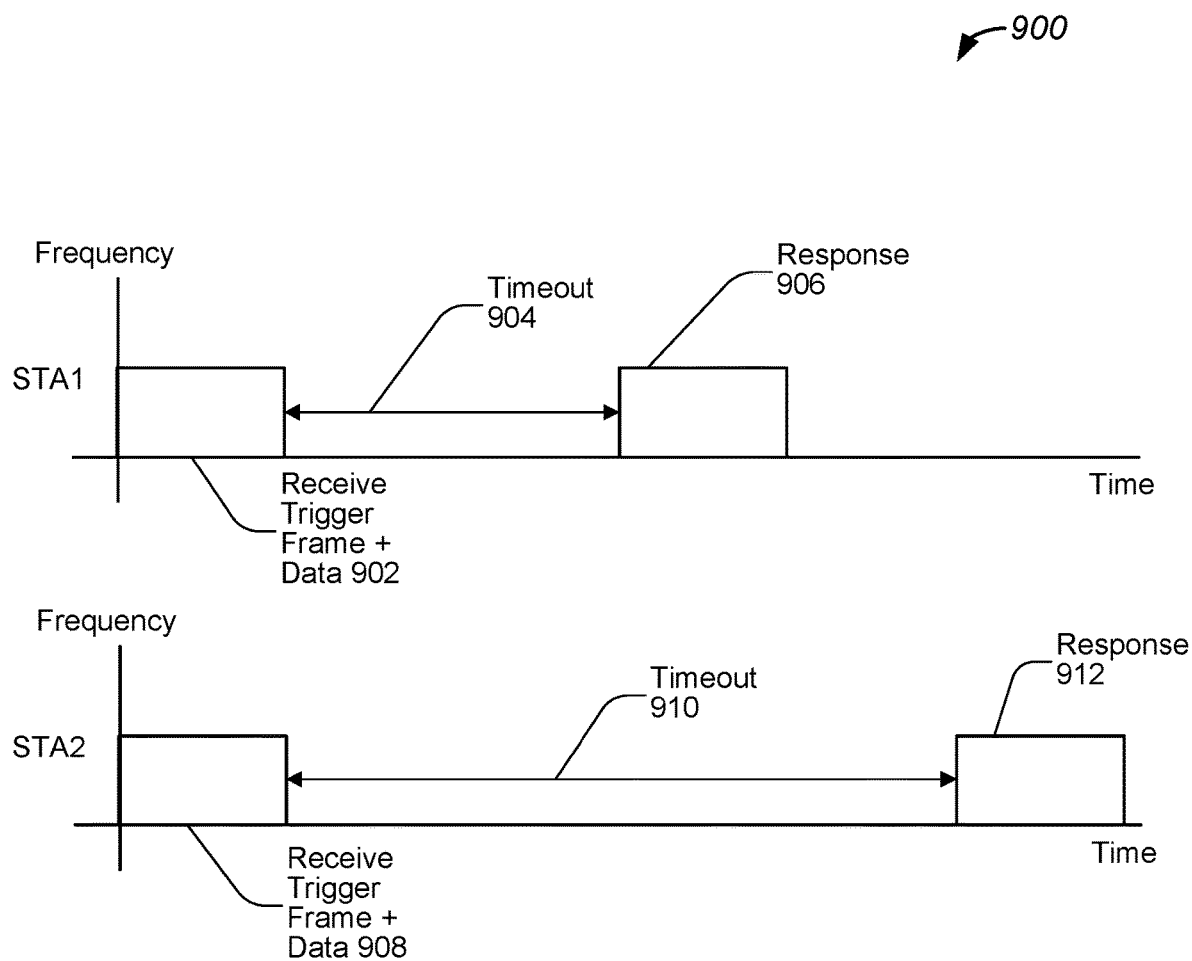
FIG. 9 illustrates an example of a station response, configured in accordance with some embodiments.

FIG. 9 illustrates an example of a station response, configured in accordance with some embodiments. As discussed above, stations may receive a trigger frame and associated data units, and may generate responses based on the received trigger frame and data units. For example, a first station may receive a trigger frame and data unit during 902, and may use the information included in the trigger frame to determine a delay or timeout period, such as timeout 904 during which it does not transmit. The first station may also determine a designated transmission time and may transmit a response at that designated transmission time, such as response 906. Moreover, the trigger frame and data units may also be received by a second station at 908. The second station may use the information included in the trigger frame to determine a delay or timeout period, such as timeout 910 during which it does not transmit. The second station may also determine a designated transmission time and may transmit a response at that designated transmission time, such as response 912. As shown in FIG. 9, timeout 904 and timeout 910 are configured to have different durations, and are further configured to prevent overlap or contention between response 906 and response 912. Moreover, as discussed above, the information used to generate both timeout 904 and timeout 910 is included in the same trigger frame received by both stations.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
   identifying, using processing elements of a software enabled access point, a plurality of wireless devices communicatively coupled to the software enabled access point;
   aggregating, using the processing elements, data associated with the plurality of wireless devices;
   generating, using the processing elements, transmission instructions identifying transmission periods for the plurality of wireless devices; and
   generating, using the processing elements, a data frame based on the aggregated data, the data frame comprising a data payload that comprises application data and transmission instructions stored for each of the plurality of wireless devices with a device identifier used for parsing of the data payload by the plurality of wireless devices, and for generation of acknowledgement messages based on the parsing.

2. The method of claim 1, wherein the aggregated data comprises a media access control (MAC) header for at least some of the plurality of wireless devices.

3. The method of claim 2, wherein the aggregated data further comprises application data associated with an application executed by the software enabled access point.

4. The method of claim 2, wherein the transmission instructions comprise an acknowledgement schedule for the plurality of wireless devices.

5. The method of claim 4 further comprising:
   receiving an acknowledgement message from at least one of the plurality of wireless devices, the acknowledgement message being generated based, at least in part, on the aggregated data and the transmission instructions.

6. The method of claim 5, wherein the acknowledgement message is generated based on a parsing of the data payload, the parsing being performed based, at least in part, on the MAC header.

7. The method of claim 1, wherein the data frame is a trigger frame.

8. The method of claim 7, wherein the trigger frame comprises timing allocation information and metadata for at least some of the wireless devices.

9. The method of claim 1, wherein the software enabled access point is compatible with a Wi-Fi protocol.

10. A system comprising:
    a transceiver configured to be compatible with a wireless communications protocol;
    a processing device coupled to the transceiver configured to:
      identify a plurality of wireless devices communicatively coupled to a software enabled access point that comprises the transceiver and the processing device;
      aggregate data associated with the plurality of wireless devices;
      generate transmission instructions identifying transmission periods for the plurality of wireless devices; and
      generate a data frame based on the aggregated data, the data frame comprising a data payload that comprises application data and transmission instructions stored for each of the plurality of wireless devices with a device identifier used for parsing of the data payload by the plurality of wireless devices, and for generation of acknowledgement messages based on the parsing.

11. The system of claim 10, wherein the aggregated data comprises a media access control (MAC) header for at least some of the plurality of wireless devices.

12. The system of claim 11, wherein the transmission instructions comprise an acknowledgement schedule for the plurality of wireless devices.

13. The system of claim 12, wherein the processing device is further configured to:
    receive an acknowledgement message from at least one of the plurality of wireless devices, the acknowledgement message being generated based, at least in part, on the aggregated data and the transmission instructions.

14. The system of claim 13, wherein the acknowledgement message is generated based on a parsing of the data payload, the parsing being performed based, at least in part, on the MAC header.

15. The system of claim 10, wherein the data frame is a trigger frame comprising timing allocation information and metadata for at least some of the wireless devices.

16. A device comprising:
    processing elements configured to:
      identify a plurality of wireless devices communicatively coupled to a software enabled access point that comprises the processing elements;
      aggregate data associated with the plurality of wireless devices;
      generate transmission instructions identifying transmission periods for the plurality of wireless devices; and
      generate a data frame based on the aggregated data, the data frame comprising a data payload that comprises application data and transmission instructions stored for each of the plurality of wireless devices with a device identifier used for parsing of the data payload by the plurality of wireless devices, and for generation of acknowledgement messages based on the parsing.

17. The device of claim 16, wherein the aggregated data comprises a media access control (MAC) header for at least some of the plurality of wireless devices.

18. The device of claim 17, wherein the processing elements are further configured to:
    receive an acknowledgement message from at least one of the plurality of wireless devices, the acknowledgement message being generated based, at least in part, on the aggregated data and the transmission instructions.

19. The device of claim 18, wherein the acknowledgement message is generated based on a parsing of the data payload, the parsing being performed based, at least in part, on the MAC header.

20. The device of claim 16, wherein the data frame is a trigger frame comprising timing allocation information and metadata for at least some of the wireless devices.

* * * * *